Figure 1:
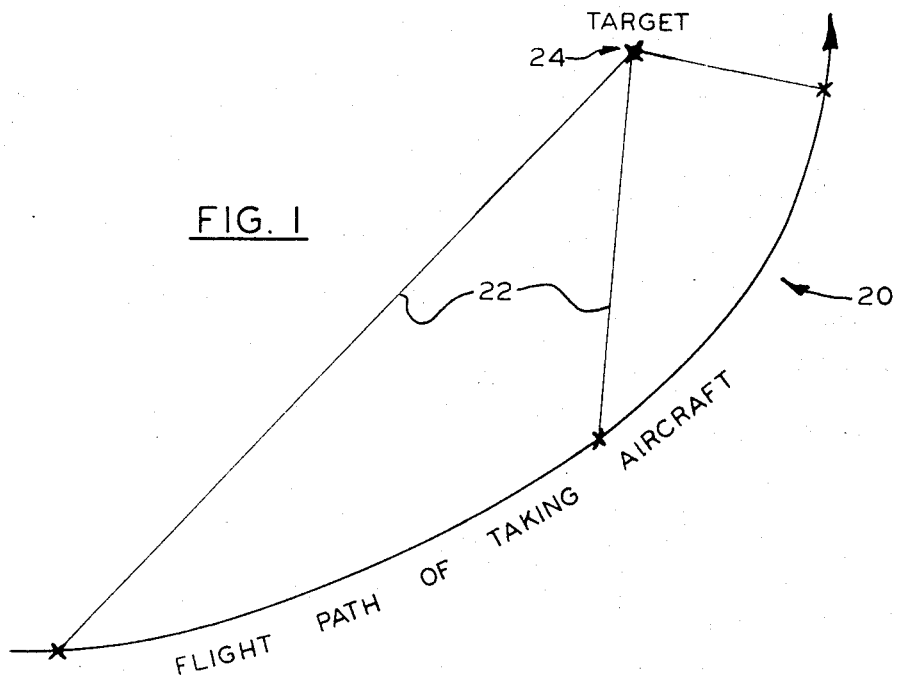

United States Patent
McGlasson

[15] 3,659,920
[45] May 2, 1972

[54] WIDE ANGLE INFINITY IMAGE VISUAL DISPLAY

[72] Inventor: Frank William McGlasson, Windsor, N.Y.
[73] Assignee: The Singer Company, New York, N.Y.
[22] Filed: Aug. 27, 1970
[21] Appl. No.: 67,385

[52] U.S. Cl. ............................350/174, 35/12 N, 178/7.88, 178/DIG. 35, 350/55
[51] Int. Cl. ..................................G02b 17/06, G02b 27/14
[58] Field of Search ...........................350/169, 174, 292, 55; 178/DIG. 1, 7.85, 7.88, 7.89, DIG. 35; 356/251, 252; 35/12 N, 25; 353/10.2, 12, 13

[56] References Cited

UNITED STATES PATENTS 3,514,871   6/1970   Tucker..................................35/12 N
2,751,816   6/1956   Strong..................................350/292

OTHER PUBLICATIONS

Larussa "Visual Spaceflight Simulators" Optical Spectra pp. 58–63 (9/10–1969)

*Primary Examiner*—David Schonberg
*Assistant Examiner*—John W. Leonard
*Attorney*—Francis L. Masselle, William Grobman and Charles S. McGuire

[57] ABSTRACT

A method of arranging a plurality of infinity image displays to form a wide angle display. Displays are shaped in the form of spherical wedges and butted together to form tiers having the desired horizontal field of view and the tiers arranged vertically to form a continuous vertical field of view. To avoid mechanical interference tiers may be segments of spheres of different sizes and may still, if arranged so that the centers of all spheres of which tiers are segments are centered at the observer's eyepoint, provide a continuous display as seen by the observer.

13 Claims, 9 Drawing Figures

Patented May 2, 1972

3,659,920

6 Sheets-Sheet 1

INVENTOR.
Frank W. McGlasson
BY Charles L. McGuire
ATTORNEY

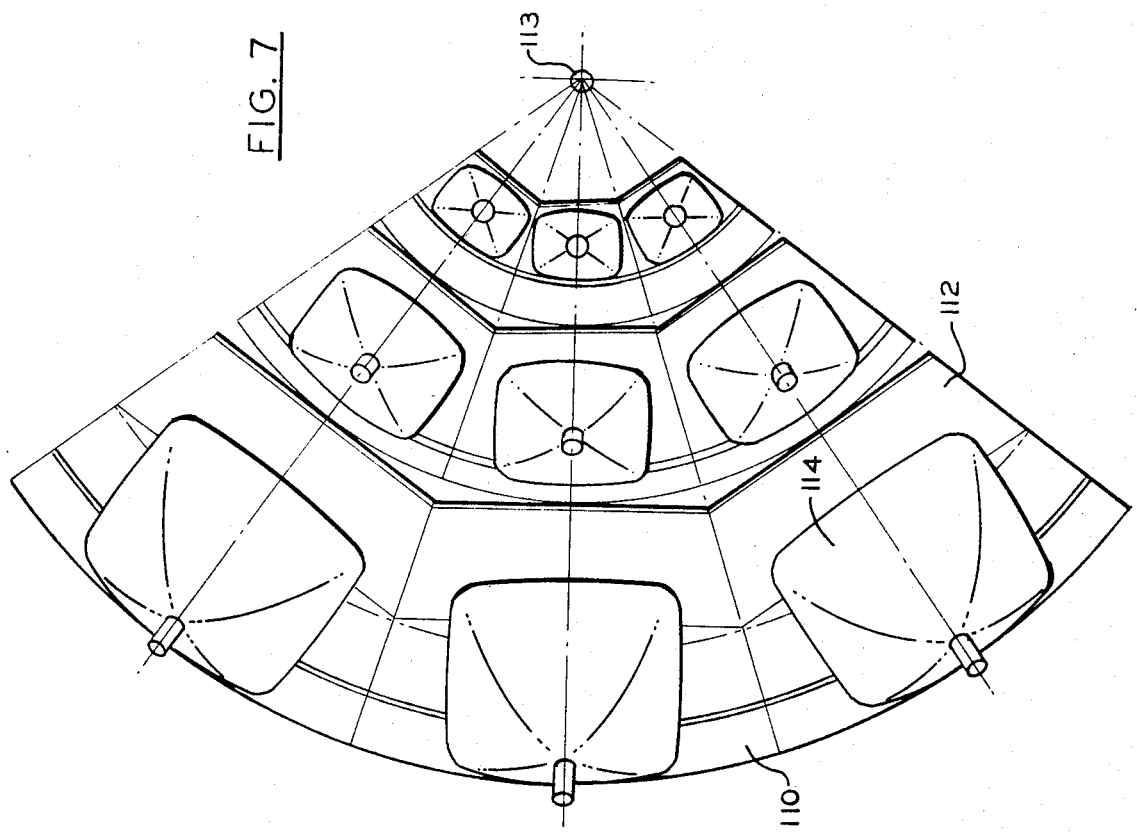
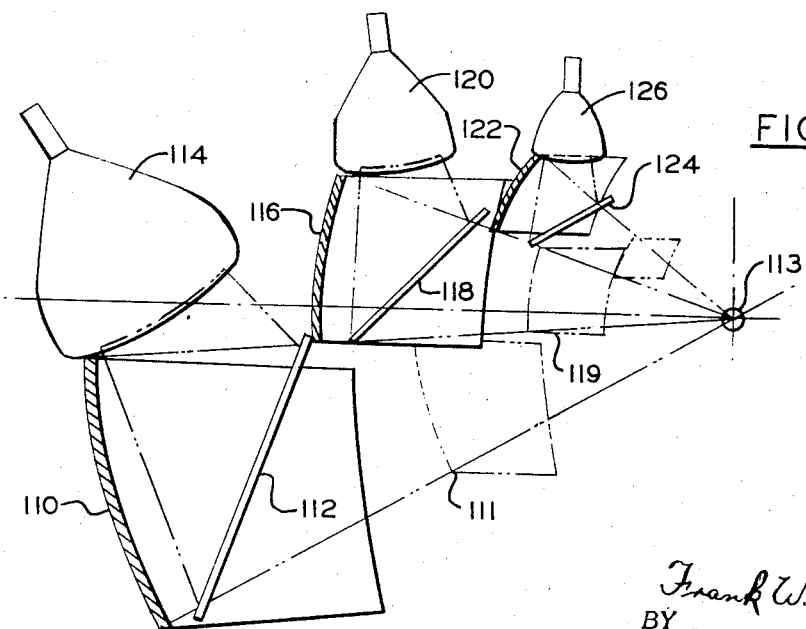

Patented May 2, 1972

3,659,920

6 Sheets-Sheet 6

INVENTOR.
Frank W. McGlasson
BY
Charles S. McGuire
ATTORNEY

WIDE ANGLE INFINITY IMAGE VISUAL DISPLAY

This invention relates to visual displays and more particularly to a method and apparatus for constructing an improved type of wide angle display using a multiplicity of narrow angle displays.

The use of visual display systems in trainers, particularly grounded aircraft trainers, has shown a steady increase. The cost of operating aircraft has risen and made training in such aircraft very expensive, thus creating a demand for trainers with increased capabilities.

One of the primary areas where this demand is great is that dealing with visual display systems. Ideally a trainee should have as wide a field of view in the trainer as he does in the actual aircraft. This is particularly true in military applications where the trainee is given weapons training and must locate targets over a wide field of view. It is also desirable to have an infinity image type display to make the scene display more realistic.

Most previous wide angle displays have been of the type where the image is projected on a screen. The major drawback of this type of display is that the image does not appear at infinity and loses some of its realism. The type of display which gives the most realistic presentation is an infinity image display utilizing a mirror-beamsplitter combination. Design considerations make it possible to construct such a display having the desired field of view utilizing a single mirror-beamsplitter combination. The problem of obtaining a wide angle infinity image display can be solved if a number of these smaller infinity image displays can be combined to form a display having the desired wide angle field of view. Previous attempts to combine such displays built in the conventional manner have failed because of mechanical interference of display inputs. One solution is to use the type of display described in U.S. Pat. No. 3,443,858. Since the displays described therein are essentially flat they may be combined to form a larger display without interference of inputs. However, they have two major problems. The transmission efficiency is much lower than that of the conventional display and the construction cost is much higher.

In addition to the problem of providing a suitable arrangement of the display devices for a wide angle infinity image display, another problem arises. If inputs to the individual displays are of a scanned raster type, such as cathode ray tubes or television projectors, it is desirable to be able to match the rasters of adjacent displays. This is particularly true if an image is to be inserted in the manner described in U.S. application Ser. No. 66,729, commonly assigned, filed on even date herewith, titled Image Placement on a Matrix Display.

It is apparent then that a system which can solve any or all of these problems would go a long way toward providing the type of visual display system which present day trainers require. The present invention discloses a method and apparatus for accomplishing these objectives.

A principal object of this invention is to provide a method and apparatus for combining a multiplicity of mirror-beamsplitter refractive infinity image displays to form a wide angle visual display.

Another object is to provide an improved visual system for use in aircraft trainers.

An additional object is to provide a method of constructing a wide angle visual display using a multiplicity of displays having a smaller field of view such that, when using inputs to the individual displays in the nature of a scanned raster, an apparently continuous raster will be presented to an observer viewing the total display.

Other objects of the invention will in part be obvious and will in part appear hereinafter.

The invention accordingly comprises the several steps and the relation of one or more steps with respect to each of the others, and the apparatus embodying features of construction, combination of elements and arrangement of parts which are adapted to effect such steps, all as exemplified in the following detailed disclosure, and the scope of the invention will be indicated in the claims.

Figure 4:
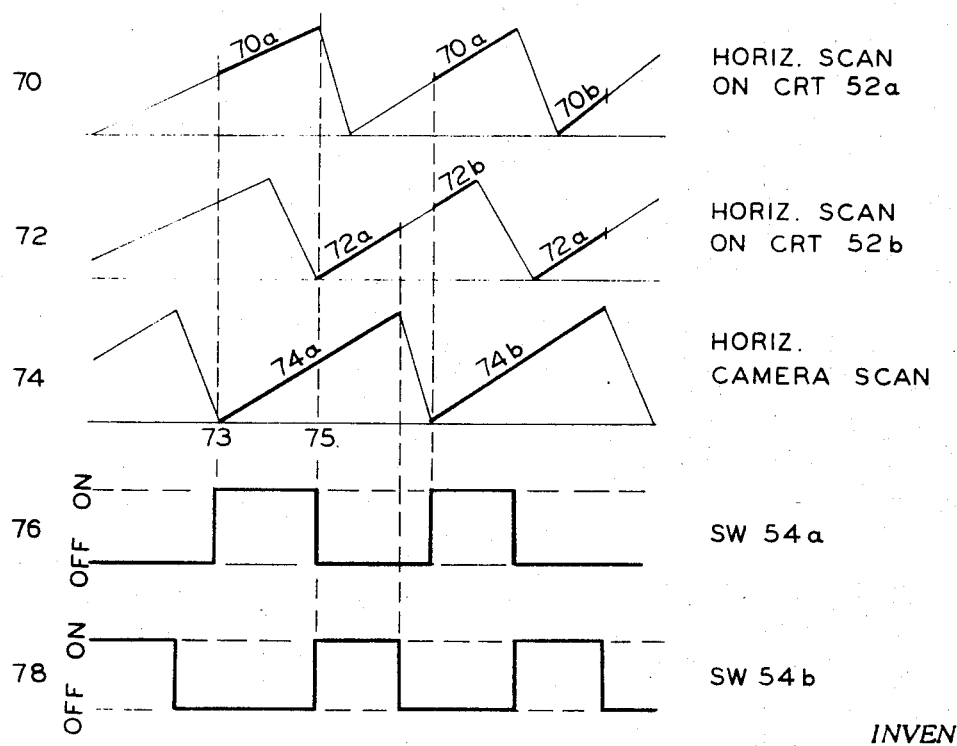
Figure 2:
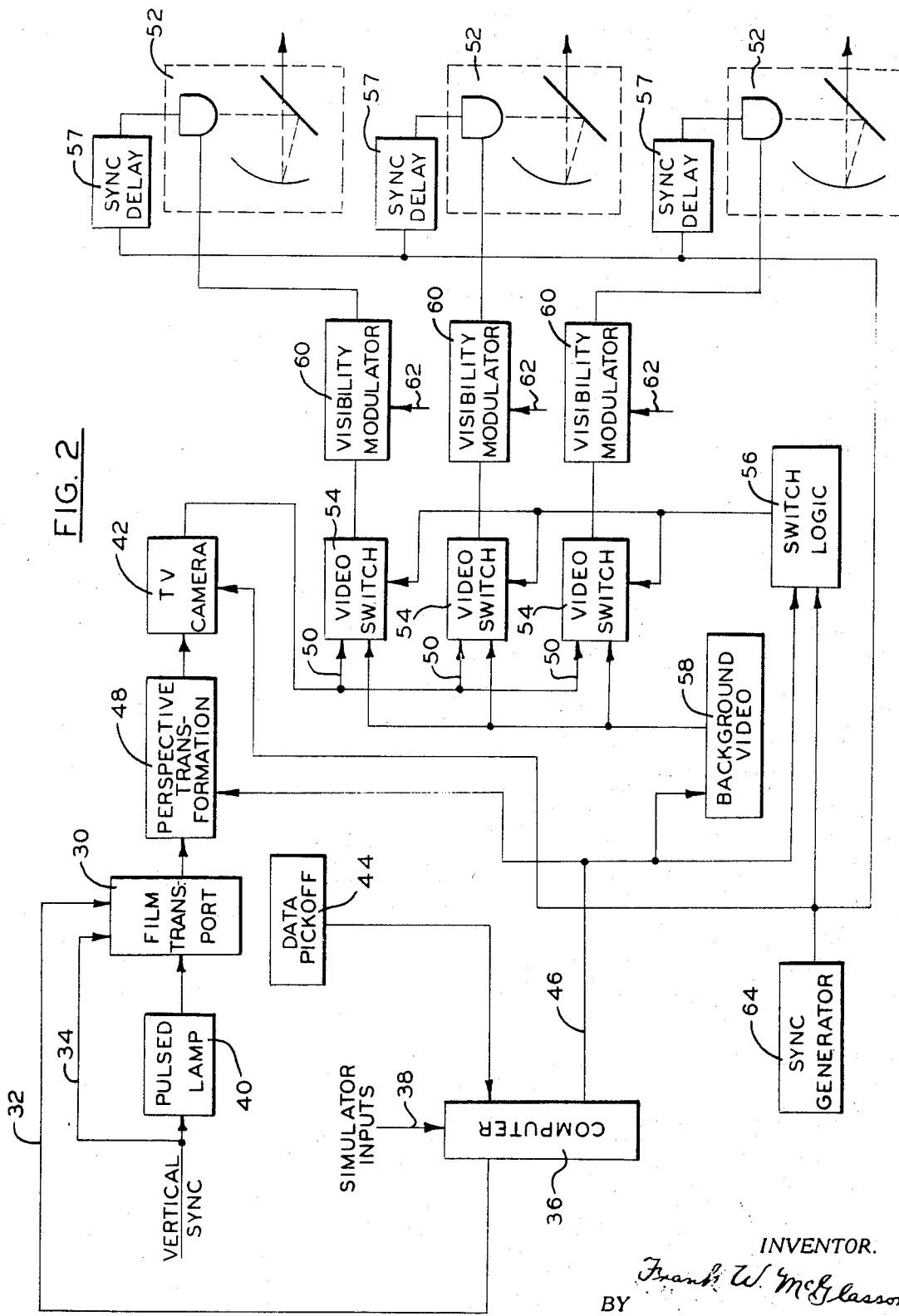
Figure 3:
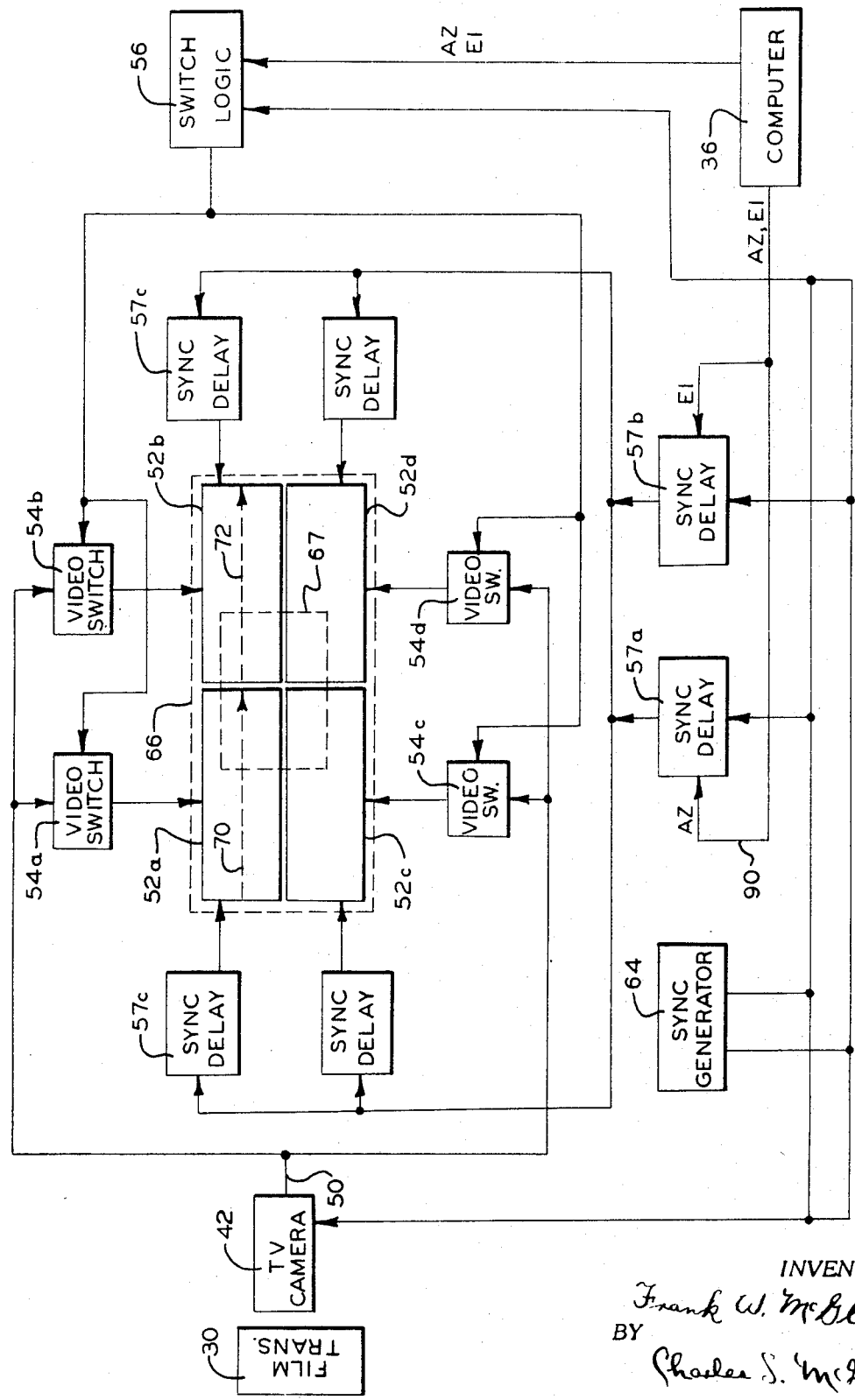
Figure 5:
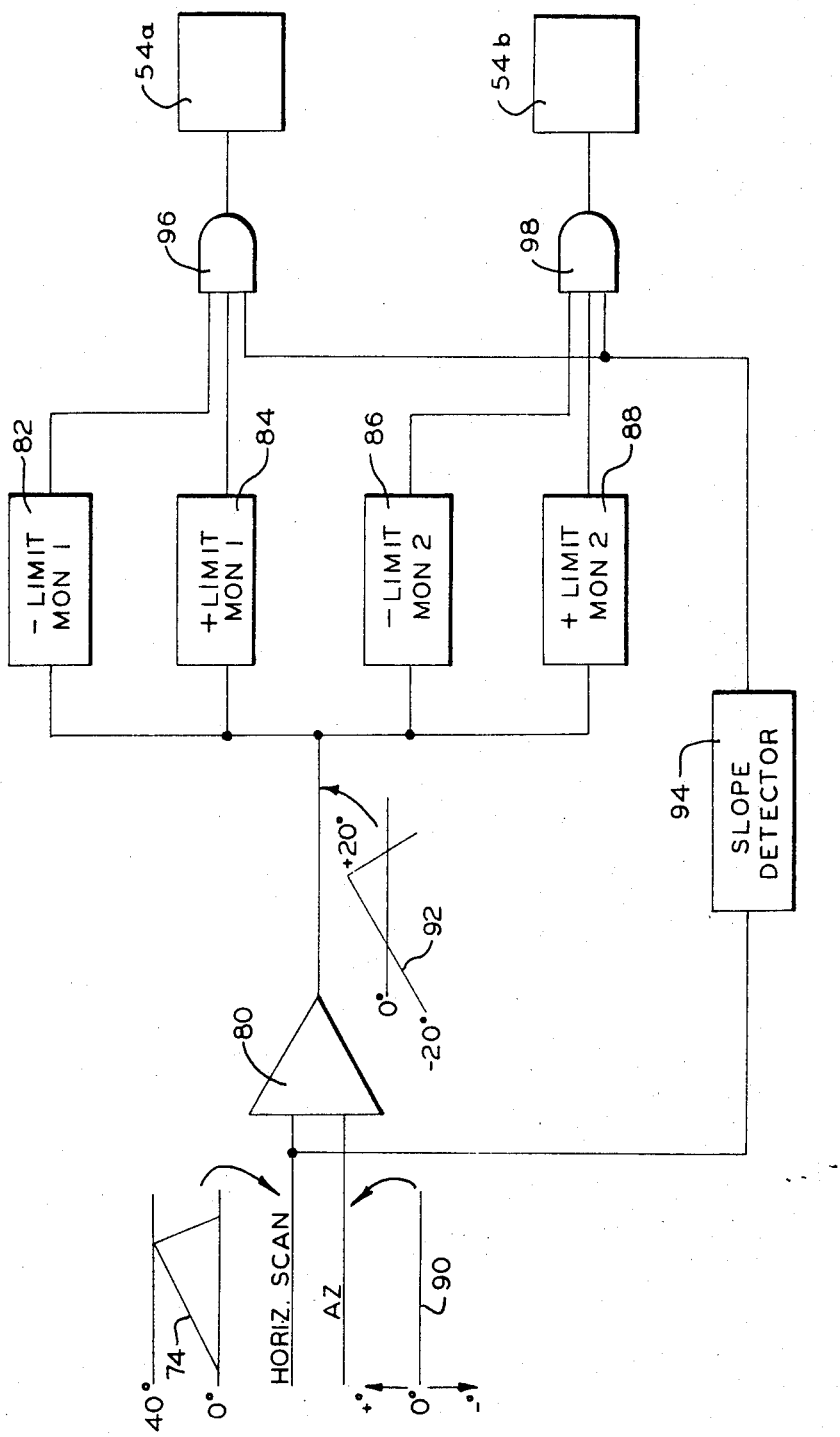
Figure 8:
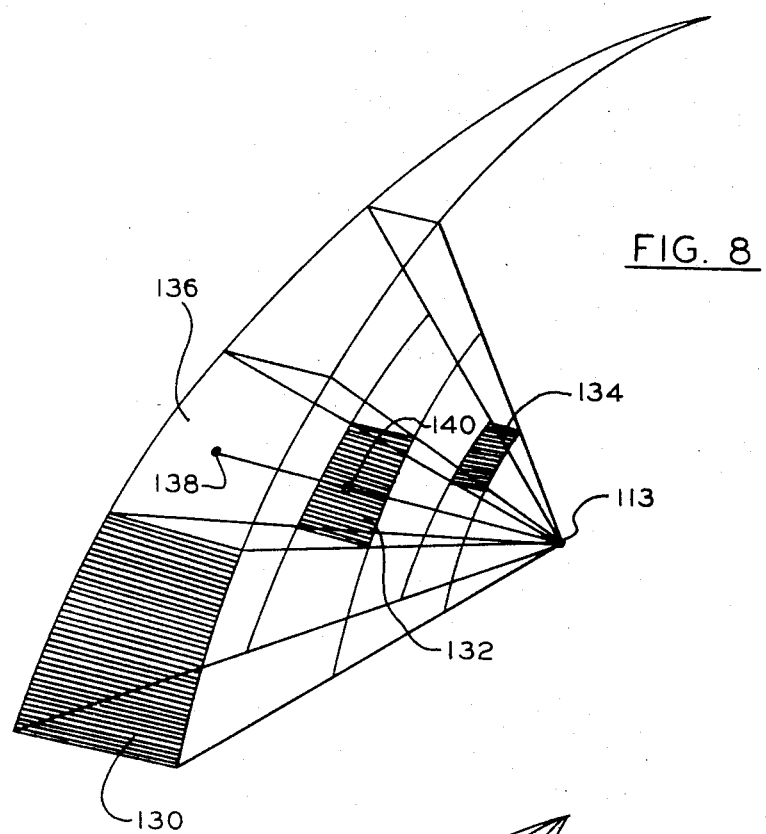
Figure 9:
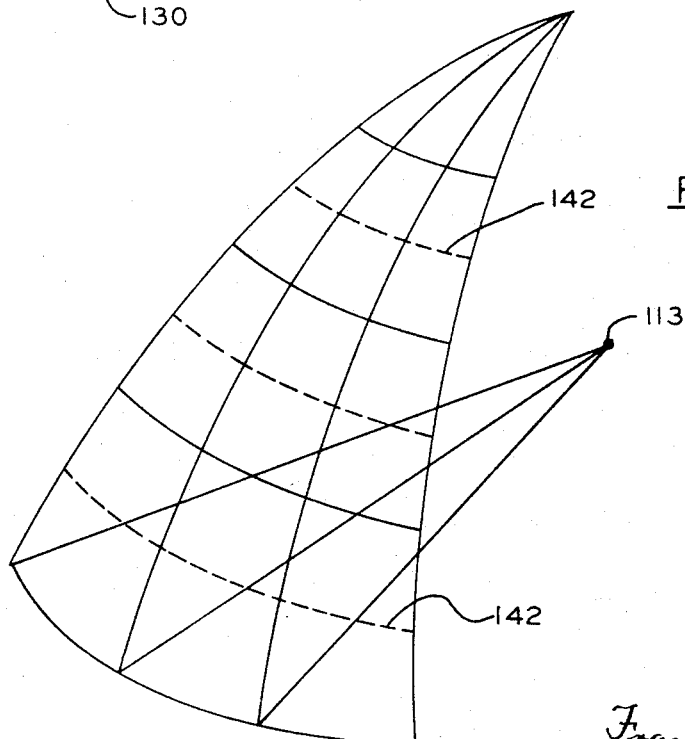

For a fuller understanding of the nature and objects of the invention reference should be had to the following detailed description taken in connection with the accompanying drawing in which:

FIG. 1 is a plan view of the geometry during filming;
FIG. 2 is a block diagram of a preferred embodiment of the total system;
FIG. 3 is a detailed block diagram of the image positioning portion of the system;
FIG. 4 is a timing diagram associated with FIG. 3;
FIG. 5 is a block diagram of the switching logic;
FIG. 6 is a side view of the display arrangement;
FIG. 7 is a plan view of the display arrangement;
FIG. 8 is a perspective view of the vertical segment in the display; and
FIG. 9 is a perspective view of an additional display embodiment showing both horizontal and vertical segments.

In the figures which follow it will be shown how the invention in its present embodiment, is able to provide to a trainee in an aircraft simulator an image of an area of interest to him in his training. Basically, a decision is first made as to the area to be displayed during training and a flight made in an actual aircraft over that area with a motion picture camera attached to the aircraft always pointed at the area of interest. The processed film is then used as an image source for the present invention. The trainee sits in a simulated aircraft cockpit which is a virtually exact duplicate of that of the real aircraft and is instructed to "fly" in a simulated path which somewhat approximates the actual path followed by the aircraft from which the motion picture was taken. Arranged around the windows of this simulated cockpit is the visual display which has as its inputs a multiplicity of TV monitors. The remainder of the system herein described, which may be at a remote location to the cockpit, operates upon the film image to give it the proper perspective from the trainee's simulated viewpoint and to properly position it in his field of view. This is done by viewing the image, as projected, with a television camera, distorting the video signal thus generated using optical and electronic techniques and then by means of proper switching, displaying the video signal so generated on the proper monitor, or monitors in the display. The distortion alters the trainee's apparent viewpoint in accordance with the computed position of the simulator, thereby providing a realistic display.

FIG. 1 shows how, in the present embodiment, an aircraft flies a path 20 as shown with the line of sight 22 of a motion picture camera, mounted in the aircraft, always pointed at a target 24, or another area of interest to the trainee. While this path is being flown, data relating to the line of sight, either in the form of angles or in the form of lateral, longitudinal and altitude information for both the taking camera and target, are recorded. The required information is then coded on the film for use in the system using standard optical or magnetic techniques. One such technique is described in U.S. Pat. No. 2,999,322 which was granted on Sept. 12, 1961 to H. S. Hemstreet and assigned to the same assignee as the present invention.

The system shown in FIG. 2 must now take this film which was previously generated and present an image to a trainee, in a simulator to which the display portion of the system is attached, properly positioned in his field of view and having the proper perspective. The film is placed in film transport 30 which is a standard pulsed pulldown type of transport and in this case is pulsed by film speed input 32 and vertical sync input 34. Film speed input 32 is generated in computer 36 as a function of aircraft velocity and position based on simulator inputs 38. Computer 36 may be a standard analog or digital computer. In addition to a pulsed pulldown, the system also has a pulsed lamp 40 which is synchronized with film transport 30 by vertical sync 34 causing it to be off during the retrace time of television camera 42. As the film passes through the transport 30, data previously recorded relating to the position from which the film was taken is picked off by data pickoff 44 and fed to computer 36. This data is then used, along with simulator data which contains the position and attitude of the simulated aircraft, to generate outputs on line 46 which are needed for the proper positioning and perspective transformation of the image. Perspective transformation is accomplished by optical or electronic means, or a combination of both, indicated by the block numbered 48 in FIG. 2, and described in U.S. Pat. Nos. 2,999,322, 3,091,662 and 3,266,912 all granted to H. S. Hemstreet and all assigned to the same assignee as the present invention.

The resulting image generated by television camera 42 will have the proper perspective. This video image is then distributed on lines 50 to video switches 54 for each of a multiplicity of displays 52 which make up a total display surrounding the pilot trainee in the simulator. Video switches 54 are controlled by switch logic 56 to properly position, along with sync delays 57, the image on the total display as will be described below. This is necessary since the size of the image picked up by television camera 42 is small as compared with the total display.

Background video generator 58 is used to fill in portions on the total display where no detailed imagery from the television camera 42 is presented. It will provide different colors and/or gray levels for ground and sky and will be controlled by attitude inputs from computer 36. Visibility modulators 60 will introduce special effects to simulate the desired degree of visibility and will be controlled as a function of inputs 62 which may be manually set by the instructor. Visibility will range from full visibility to a point where no image is visible, simulating heavy fog.

To understand how proper positioning is accomplished FIGS. 3 and 4 must be examined together. Displays 52a through 52d, e.g., television monitors, are arranged to form a continuous display. The particular means of physically arranging the display devices used in the present embodiment to provide continuity of the display area will be described later. The image generated by television camera 42 may appear anywhere within the total display area, indicated by dotted line 66, as a function of the simulated aircraft position and attitude, and the position of the image being viewed relative to the position and attitude of the taking camera. As previously indicated, this information is available in the computer 36 from the simulator data input and the film data input. It is possible then to compute, using standard methods, the line of sight from the simulated aircraft to the center of the image to be displayed. This can be resolved into two components, an azimuth and an elevation, respectively representing the horizontal and vertical angles between the simulated aircraft axis (or other fixed reference) and the line of sight. This information is provided from computer 36 to the sync delays 57a and 57b and to switch logic 56.

This discussion will deal only with the horizontal positioning which involves the horizontal scan and the azimuth data but in all cases the same analysis applies to the vertical positioning which involves the vertical scan and elevation data. The master horizontal and vertical scans are generated by sync generator 64 and are then distributed to the camera 42, sync delays 57a and 57b and switch logic 56.

To be able to position the image on two or more of TV monitors 52a–52d it is necessary to have a continuous raster covering any area within the total display area 66. The manner in which this is accomplished can best be seen by examining traces 70 and 72 on FIG. 4. Trace 70 represents the horizontal scan of monitor 52a, showing the relationship of the horizontal position of the scanning spot to time. The long, increasing portion of the trace represents movement of the spot from left to right across the monitor. The short, decreasing portion is the retrace of the spot back to its starting point. During retrace, information is normally not displayed. Traces 72 and 74 similarly represent the horizontal scans of monitor 52b and the TV camera, respectively. Normally, if the monitors and camera were all connected to the same source of synchronization, e.g., sync generator 64, the time relationship of each would be the same and both monitors would display the image picked up by the camera. Considering only the rasters of the two monitors 52a and 52b, it can be seen that if they were synchronized both would retrace during the same time. If it is desired to have a continuous raster from one display to another it is necessary that as a horizontal line is completed on the first monitor, the line in the same horizontal position on the second monitor must start its motion across the face of the tube. This requires that a delay be inserted so that the two traces are no longer synchronized. Examining these traces it will be seen that as trace 70 reaches its peak, indicating the end of the scan, and starts its retrace, that trace 72 starts its scan. The result as displayed on monitors 52a and 52b will be an apparently continuous raster line across the two monitors. The delay in 70 causing it to reach its peak at a later time than 72, is accomplished by a fixed sync delay 57c. This is a normal fixed delay line and one is provided for both the horizontal and vertical scan of each monitor used. By proper adjustment of these delays, a continuous raster in both the horizontal and vertical directions over a number of displays can be created.

Having created a continuous raster it is now necessary to position the image generated by camera 42 on that raster. Assuming an azimuth of 0° represents centering on the total display 66 it can be seen that half of a horizontal line in the upper portion of the image area 67 must be on monitor 52a and half on 52b. To achieve this result a camera scan 74, related in time to scans 70 and 72 as shown on FIG. 4, is necessary. At time 73 camera scan 74 is starting its scan across the image. For the azimuth given, this portion of the image should be displayed at about the middle of monitor 52a. If the trace 70 of monitor 52a is half way across the monitor at time 73 this result will be achieved. As camera trace 74 reaches its mid point at time 75 monitor 52a's trace will be starting its retrace. But, since the relative timing of traces 70 and 72 has been adjusted to form a continuous raster, the remainder of the camera trace will coincide in time with the first half of monitor 52b's trace 72. The result then is that one horizontal camera line 74a on trace 74 will coincide for the first half of its time with the last half of monitor 52a's trace 70, shown by 70a, and will coincide for the second half of its time with the first half of monitor 52b's trace 72, shown by 72a. However, if nothing further is done, unwanted information will also be displayed. Looking at the portion of trace 74 labeled 74b and its relation to traces 70 and 72 it can be seen during the time information is displayed on the last half of monitor 52a, shown by 70a, we will be displaying the same information on the last portion of monitor 52b, shown by 72b. Likewise when showing the desired information on the first portion of monitor 52b, as shown by 72a, the same information will be displayed on an undesired portion of 52a, shown by 70b.

To avoid this problem video switches which will switch on the video signal only when the proper information is present may be used. Video switches 54a, 54b, 54c, and 54d, shown in FIG. 3, are used for this purpose. The inputs to switches 54a and 54b are shown by traces 76 and 78 (FIG. 4), respectively. By operating the switches in accordance with the timing of the traces shown, only the desired information will appear on each monitor. Each switch is on only during that portion of camera trace 74 when information is to be displayed on its respective monitor. For example, switch 54a, associated with monitor 52a, is on only during the portion of the camera trace 74 between times 73 and 75. Therefore, during the portion of monitor 52a trace 70 labeled 70b, the switch will be off and no improper information displayed. Likewise, switch 54b is only on when it is desired to display information on monitor 52b. All switches are off during camera trace time, and retrace times of their respective monitors. During the times when a monitor is being scanned but has its respective switch off, another switch may be operated to insert fill-in information.

It was assumed above that camera trace 74 was in the proper time relationship to monitor traces 70 and 72. To accomplish this relationship a variable sync delay 57a shown in FIG. 3 is used. This is a standard variable delay line which is controlled as a function of azimuth. In the example given with 0° azimuth the camera trace was positioned so that equal portions coincided with monitor traces 70 and 72. As azimuth is changed left or right the delay line 57a will cause a corresponding shift of trace 74 in relation to traces 70 and 72 and different amounts of the image will be displayed on monitors 52a and 52b. The operation of video switches 54a and 54b must also be synchronized with the camera scan and with azimuth to maintain the proper time relationships shown on FIG. 4.

FIG. 5 shows how these video switches may be operated as required. One line of horizontal camera scan 74 which is generated by sync generator 64 represents a horizontal motion in scanning across the image. This motion can be related to a horizontal field of view on the image being scanned. The amplitude of camera trace 74 may then be used to represent an angle. If the camera horizontal field of view is 40° then the maximum amplitude of trace 74 may be said to equal 40°, half the maximum 20°, one-quarter 10°, etc. If it is also assumed that monitors 52a and 52b have a 40° field view, then the junction of the two may be given the value of 0° and the left side of monitor 52a, −40° and the right side of monitor 52b, +40°.

Knowing the limits of the monitors it is possible to set up a means of detecting whether a given signal is within the monitors' limits. FIG. 5 shows such a means. Comparators 82 and 84, the former set to detect values less than −40° and the latter values greater than 0°, may be used as inputs to AND gate 96 which will have an output when the input to comparators 82 and 84 is not less than −40° and not greater than 0°. The third input gate to gate 96 from slope detector 94 will inhibit gate 96 from turning on when the slope is in a negative direction, i.e., during retrace. The output from gate 96 may then be used to operate video switch 54a. In a like manner comparators 86 and 88 may be set to detect values of less than 0° and greater than +40°, thus causing gate 98 to operate switch 54b when the input is greater than 0° and less than +40° and the slope is positive. It is now necessary to provide the proper inputs to the comparators.

At the assumed value of 0° azimuth, and an assumed image of 40 horizontal degrees, an image should be displayed on monitor 52a from −20° to 0° and on monitor 52b from 0° to +20°. This means that switches 54a and 54b must be on during these respective times. The input 92 to the comparators which will provide this result is shown on FIG. 5. Input 92 is obtained by summing azimuth 90 and the horizontal camera scan 74 in summing amplifier 80. By scaling azimuth such that 0° of azimuth is equal to minus one half the maximum value of trace 74 the resulting trace 92 after summing will be half negative and half positive. Since the maximum value of the trace is 40° then it will represent scanning from −20° to +20°. As the scan begins its value is greater than −40° and less than 0° causing switch 54a to be on and 54b to be off. As the trace 92 passes 0° switch 54a will turn off since the limit of comparator 84 has been reached and switch 54b will turn on since the trace is within the limits of being greater than 0° and less than +40°. When the camera scan 74 retraces switch 54b will be turned off and 54a held off due to the signal from slope detector 94. Video switches 54a and 54b are standard, solid-state video switches of the type commonly used in video insertion and special effects applications.

As azimuth is changed, sync delay 57a will cause the time relationships between the camera scan and the monitor scans to change. At the same time the azimuth signal will shift trace 92 up or down displaying more or less on each of the monitors. For example, if azimuth were increased to 30° then trace 92 would represent −50° to −10°. The result would be that as the trace starts neither switch would be on since −50° is less than the −40° lower limit of comparator 82 and its associated switch 54a, and it is less than the 0° lower limit of comparator 86 and its associated switch 54b. As the trace 92 reached −40°, switch 54a would come on and stay on until retrace. Since the trace never gets past 0°, switch 54b would remain off.

For this method of positioning the image to be useful it is necessary to have a means of combining a number of display devices to form a wide angle total display. FIGS. 6 and 7 show how this may be done. FIG. 6 shows a side view of three tiers of mirror beamsplitter infinity image displays. Considering the display comprising spherical mirror 110, beamsplitter 112 and input cathode ray tube 114, it is well known in the art that making the radius of curvature of the face of the cathode ray tube one half that of the mirror and placing the display surface of the CRT at a distance from the mirror equal to one half the radius of the spherical mirror, will result in an image focused at infinity. By placing the mirror at a distance 111, equal to its radius, from the nominal eye position 113 of an observer, the maximum possible amount of allowable head motion without distortion results.

Because of practical limitations of size, such a display has a limited field of view. To obtain an increased field of view it is desirable to combine a number of these displays. FIG. 7 shows how it is possible to butt together two or more displays and increase the horizontal field of view by shaping mirror 110 and beamsplitter 112 into a section of a sphere equal in radius to the spherical mirror with the sides shaped such that the joints represent lines of longitude on a sphere. However, when an attempt is made to increase the vertical field of view by butting another mirror and beamsplitter directly above the first tier, input cathode ray tube 114 is in the way as can be seen by examining FIG. 6.

The present invention solves this problem by constructing a second tier of sections of a smaller sphere comprising mirror 116, beamsplitter 118, and input cathode ray tube 120. The spherical mirror is placed as close as possible to and above beamsplitter 112 and the mirror's required radius is determined by the distance 119 to the nominal eye position. Since its radius is proper for its distance from the observer it will also allow a maximum change in eye position without distortion. The same method is used in constructing the third tier of displays comprising spherical mirror 122, beamsplitter 124 and input cathode ray tube 126. Additional tiers may be constructed until a practical limitation due to small size is reached.

FIG. 8 shows how this display presents a continuous display in the vertical direction. The image of one of the displays in the first tier is represented by shaded area 130, that of one in the second tier by 132, and that of one in the third tier by 134. What results from the construction are sections of three spheres all centered at the nominal eye position 113. Because the centers are coincidental, angular relationship will remain the same. This means point 140 will appear on surface 132 in the same angular position as point 138 would have appeared on surface 136 if the same size mirror were used. If positioning is done using angular information, as was previously disclosed then, since all images are focused at infinity and all angular relationships are proper, the display will appear continuous.

An understanding of these angular relationships also makes it possible to see how rasters may be matched from one display to another. If the raster is scanned such that the beam traverses equal angles in equal time in the horizontal direction, then the horizontal scans can be matched whether the displays 142 are arranged in one spherical segment as shown in FIG. 9 or three spherical segments as shown on FIG. 8. Only angles and time are important, size does not matter. In the vertical direction each successive raster line can be displaced through an equal vertical angle. In this way a raster which is in a controlled angular relationship to time may be made continuous from one display to another using the method previously described.

Although the present embodiment utilizes beamsplitter-mirror type displays, this portion of the invention relating to the formation of a continuous raster may be practiced using refractive as well as reflective displays as long as the segments are constructed such that their edges form what are equivalent to lines of longitude on a sphere. In addition, the segments may be arranged to form one sphere or may be arranged in tiers as shown as long as they have their images focused at infinity and are all centered at the same nominal eye position.

What is claimed is:

1. A method of arranging a multiplicity of narrow angle infinity image displays to form a composite, wide-angle display shaped as a spherical segment bounded on the sides by lines of longitude having an angular separation equal to the desired horizontal field of view and on the top and bottom by circles of latitude having an angular separation equal to the desired vertical field of view comprising:
   a. establishing a reference circle of latitude on a sphere centered at a nominal eye position;
   b. shaping a first tier comprising one or more of said narrow angle displays in the form of a spherical segment bounded on the sides by lines of longitude equal to the desired horizontal field of view, on the bottom by said reference circle of latitude and on the top by another circle of latitude;
   c. shaping a second tier comprising one or more of said narrow angle displays in the form of a spherical segment bounded on the sides by lines of longitude of the same angular spacing as said first tier and on the bottom by a circle of latitude of the same angular spacing from said reference latitude as the circle of latitude bounding the top of said first tier and on the top by another circle of latitude;
   d. placing said first tier so that the sphere of which it is a segment is centered at said nominal eye position and the circle of latitude bounding the bottom coincides with the reference circle; and
   e. placing said second tier so that the sphere of which it is a segment is centered at said nominal eye position, and the circle of latitude bounding its bottom has the same angular spacing from said reference latitude as the circle of latitude bounding the top of said first tier, and the angular spacing between said reference latitude and the circle of latitude bounding the top of said second tier is at least equal to said desired vertical field of view.

2. The method according to claim 1, wherein said narrow angle displays comprise reflective mirror-beamsplitter displays, including the further steps comprising:
   a. determining the distance from said nominal eye position to a point in front of and above said first tier where the bottom of said second tier may be placed without interference; and
   b. constructing said second tier using spherical mirrors having a radius equal to said distance.

3. The method according to claim 1 wherein said first and second tiers comprise a plurality of narrow angle displays arranged in horizontally abutting relation.

4. The method according to claim 3 wherein each of said plurality of displays is formed as an individual spherical segment bounded on the sides by lines of longitude and on the top and bottom by lines of latitude.

5. Wide angle display apparatus comprising:
   a. a first tier comprising one or more narrow angle displays, said first tier shaped as a first spherical segment bounded on the top and bottom by lines of latitude;
   b. a second tier comprising one or more narrow angle displays, said second tier shaped as a second spherical segment bounded at the top and bottom by lines of latitude, said bottom line of said second tier having the same angular spacing from the bottom line of said first tier as the top line of said first tier, the centers of said first and second spherical segments being coincident and located so that a plane passing through said center and intersecting the surface of said first tier to form a line of longitude will also intersect the surface of said second tier.

6. The invention according to claim 5 wherein said tiers are bounded on the sides by lines of longitude.

7. The invention according to claim 6 wherein said tiers are bounded by the same lines of longitude.

8. The invention according to claim 5 wherein and tiers comprise a plurality of narrow angle displays arranged in horizontally abutting relation.

9. The invention according to claim 8 wherein each of said plurality of displays is shaped as a spherical segment bounded by lines of latitude and longitude.

10. The invention according to claim 5 wherein said first tier is a section of a different sphere than said second sphere.

11. The invention according to claim 10 wherein the sphere of which said second tier is a segment has a radius less than the sphere of which said first tier is a segment.

12. The invention according to claim 5 wherein said narrow angle displays comprise reflective mirror-beamsplitter displays.

13. The invention according to claim 12 and further including a CRT image input to said mirror-beamsplitter displays.

* * * * *